May 31, 1966  M. I. COHN ETAL  3,253,791
METHOD OF TREATING KAOLIN
Filed Dec. 21, 1964

INVENTORS
ROY D. PERDUE
BY MORRIS I. COHN

Dike, Thompson, Bronstein & Mrose
ATTORNEYS

United States Patent Office 3,253,791
Patented May 31, 1966

3,253,791
METHOD OF TREATING KAOLIN
Morris I. Cohn, Needham, and Roy D. Perdue, Andover, Mass., assignors to Mineral Industries Corporation of America, Needham, Mass., a corporation of Massachusetts
Filed Dec. 21, 1964, Ser. No. 419,756
9 Claims. (Cl. 241—24)

This application is a continuation-in-part of our copending application Serial No. 329,586.

This invention provides a method and apparatus for grinding and purifying clay. Specifically, it provides a method and apparatus for treating clay bearing ores and impure clay concentrates to remove from said ores and concentrates non-clay impurities.

This invention has special utility for the treatment of impure clay derived from so-called primary or residual kaolin deposits but is also applicable to impure clay deposits of all kinds. In the United States residual clay deposits are found in Vermont and Minnesota as well as other states. Such deposits contain only 50 to 60% of the mineral, kaolinite, and frequently are less pure, i.e., only 15% kaolinite. Thus, in order to obtain clean, grit-free kaolin products of satisfactory color from residual deposits, it is necessary to remove substantial quantities of impurities. The conventional dry methods employing air separators, which methods are well-known to those in the art, frequently will not remove these impurities to a sufficient extent to permit residual kaolin deposits to be used in preparing high-grade clay products for such applications as the filling and coating of paper.

Kaolin is used in the manufacture of paper in order to develop from the basic cellulosic structure a product of of greater utility. The kaolin can be incorporated in either the cellulosic fibers, in which case it is called a filler grade or the kaolin can be laid upon the surface of the paper as a thin film, in which case it is called a coating grade. Greater utility of the finished paper arises from the fact that the paper thus formed will have greater opacity, smoothness, brightness and gloss; better receptivity to inks and other surface treatments; and improved color and other properties.

With respect to particle size, kaolins for paper filling applications must be approximately 30% finer than 2 microns E.S.D. (equivalent spherical diameter). Kaolins for paper coating applications must be at least 70% finer than 2 microns (.00008 inch) and present trends are towards exceedingly fine kaolins which are higher than 90% in material that is finer than 2 microns. These exceedingly fine kaolins command a premium selling price, and indeed, it is always the case that all other properties being approximately equal, the finer the kaolin the higher the selling price.

As sources of kaolin which have the proper size distribution and purity for paper and other applications become exhausted, the problem of grinding and purifying kaolin deposits for use in paper has received more and more attention. It is exceedingly desirable to provide a convenient and economical method of grinding and purifying impure clays to provide resulting products which meet particle size and purity requirements for paper coating applications.

The development of such a method has been the subject of many patents by established kaolin producers. These producers are further motivated by the relative imbalance of demand for coating and filler grades wherein the latter are frequently discarded even after expensive water washing operations in order to secure adequate amounts of the former.

The water-washing operations mentioned above, as practiced by the clay industry in Georgia, are somewhat more effective than the aforesaid dry methods in separating the impurities from both residual and secondary kaolin ores. Nevertheless, these water-washing techniques in the case of certain clay deposits, because of the nature of the impurities, cannot produce sufficiently pure products which will meet the exacting specifications required of clays for the paper industry. Although substantial portions of the non-clay mineral impurities in residual deposits are removed by conventional water-washing operations, excessive amounts of such impurities as fine silica, iron aluminum silicates, chlorites and other components, cannot be so eliminated.

Without the elimination of most of the aforesaid non-clay impurities, clay derived from residual and sedimentary deposits is often too abrasive, of poor color and brightness, of a plastic and dilatent nature, or characterized by other properties which preclude the use of these clay products in paper filling and coating operations. Because such use provides one of the most important commercial outlets for clay products, it is important that a method and apparatus be available for removing such impurities from clay. It is an object of this invention to provide such a method and apparatus.

It is another object of this invention to provide a method for reducing the particle size of kaolins, including those particles which already are small in size, that is, 25 microns and less, but not small enough, to exceedingly small sizes, which method is economical, continuous, virtually instantaneous and easy to carry out. It is another object of this invention to provide such a method for treating kaolins to convert them to products of commercial utility, especially meeting paper filler and coating requirements with respect to particle size and purity.

It is another object of this invention to provide an economical method and apparatus for treating both impure residual or primary and secondary kaolin deposits and concentrates to substantially reduce the abrasiveness thereof by removal of abrasive impurities therefrom.

It is a further object of this invention to provide a novel method and apparatus for grinding and purifying clays, no matter what their source or origin.

The above mentioned objects are achieved in accordance with the present invention by applying a high fluid pressure on a slurry of kaolin particles to force the slurry to flow in the form of a thin film edgewise and at a high velocity by virtue of reduction of such high pressure to a lower pressure, through a highly restricted opening or gap formed by closely spaced hard surfaces to thereby impart shearing, turbulence, shattering, impact and cavitation forces on the clay particles in the slurry, which reduce the size of the kaolin particles, including substantial amounts of particles 25 microns and less in size, to thereby significantly increase the amount of minus 2 micron particles. Thereafter, the slurry is passed through a hydroclassifier such as a hydrocyclone or a solid bowl centrifuge or a group of such hydroclassifiers designed to yield, as overflow, a product of the desired particle size distribution and of increased purity, and, as underflow, oversize particles and substantial amonuts of impurities. Preferably, the underflow is subjected to an operation such as a second hydrocyclone or other hydroclassifier to remove the impurities. The remaining portion (wihch becomes the overflow in the second hydroclassifier) is recycled back through the opening or gap to thereby ensure the grinding of substantial amounts of particles 25 microns or less to the minus 2 particle size required. The highly restricted opening or gap is in the nature of a fraction of an inch.

Preferably, the slurry is discharged from the opening at a high velocity against a hard impact surface directly in front of the opening. Discharge against the hard impact surface provides optimum treatment of the particles in the slurry but is not essential.

In a preferred embodiment, the restricted opening or gap comprises a valve opening and the slurry under pressure is directed against the valve to force it slightly away from its seat against the force of resilient means, such as a spring or the like, yieldingly urging it toward its seat, whereby the slurry under pressure is forced, in the form of a thin film, edgewise at an extremely high velocity through the highly restricted opening between the valve and its seat and against the impact surface. The direction of flow of the kaolin slurry through the valve opening is at an angle to the direction of flow to the valve, and the opening is preferably annular in shape, that is, it has the shape of a thin annular disc.

Preferably, the valve is rotated to prevent the slurry from wearing a channel in the valve seat and to cause the wear effects of the slurry on the valve and the valve seat to be more uniform, whereby the useful life of the valve and the valve seat before overhaul and repair become necessary is substantially increased.

If desired, the valve may be non-yieldably and adjustably held at the desired distance from the valve seat to provide the restricted opening.

The fluid pressure can be generated by suitable pressure pump, such as a piston pump operating on the slurry.

The valve, mounted on or near the pump discharge, can be one of several designs, such as that used for high pressure homogenization of milk and is commonly referred to as a homogenizing valve.

The impact surface can be provided by an impact ring around the annular valve opening and within a fraction of an inch therefrom. The ring forms with the periphery of the valve and valve seat a passage of restricted cross-section extending at an angle to the valve opening and through which the slurry flows after impacting against the ring. A pump and valve assembly such as that known as a Manton-Gaulin single stage homogenizing valve assembly is suitable.

The apparatus described in our co-pending U.S. application Serial No. 316,187, now Patent No. 3,162,379, and in our U.S. Patent No. 3,039,703 are suitable for carrying out the grinding phase of the present invention. However, valves of similar or modified design providing like action can be used within the scope of this invention. The preferred pressure is 1500 p.s.i. but the pressure may range from 100 or 200 p.s.i. to 5000 or 6000 p.s.i. and more as described in the above application.

It has been found that grinding the clay particles in this particular manner followed by treatment of the ground particles in the hydroclassifier results in an unexpectedly larger amount of impurity removal in the hydroclassifier, as compared to conventional grinding techniques, as for example, ball mills and high shear colloid mills, and as compared to no grinding at all prior to the hydroclassifier.

Also, the properties of the clay particles treated in this manner make them more suitable as fillers and coatings in paper than clay particles treated with conventional grinding techniques for reasons other than increased purity. Evidently, this is due to the fact that the ground clay particles retain more of their plate-like shape as distinguished from being ground into more granular shapes, which occurs with conventional grinding techniques and because of the fact that more of the ground particles are reduced in size to less than minus 2 microns.

Without the recycle step it is more difficult to grind a large amount of the clay particles 25 microns and less to particles of minus 2 microns as required for paper coatings and fillers.

The hydroclassifier device can be a solid bowl centrifuge, hydrocyclone, or the like designed to yield, as overflow, a product of the desired particle size distribution, and, as an underflow a stream which can be beneficiated to remove the impurities and then recycled back to the pump and valve assembly.

In application Serial No. 329,586, the concentration of kaolin solids in the slurry feed to the pump and valve are described as substantially greater than 25% by weight, and preferably not substantially less than 30% by weight. Grinding efficiency increases rapidly as the concentration is increased above 25% to substantially increase the grinding of minus 25 micron particles to minus 2 micron particles. In the present invention, the grinding of minus 25 micron particles to minus 2 micron particles is even further increased by recycling the oversize underflow of the hydroclassifier back through the homogenizer. Also, the combination of the homogenizing valve and a hydroclassifier, such as a hydrocyclone, provides a novel and efficient way of ridding the clay slurry in the hydroclassifier of objectionable impurities such as abrasive silica, feldspar and other impurities which detract from the usefulness of the final clay, i.e., discoloring and abrasive impurities. Thus, as aforesaid, it has been found that by passing the output of the homogenizing valve through one or more hydroclassifiers, such as a hydrocyclone, substantial amounts of impurities are removed during the cyclone step as compared to cycloning without prior passage through an homogenizing valve or cycloning after a conventional grinding operation, e.g., ball-milling, so that such cycloning step functions to remove impurities as well as to classify the clay particles. Where there is no recycling of the underflow from the cyclone the impurities are discarded with the underflow. Where there is recycling of the underflow, the impurities are first removed from the underflow as for example by another hydrocyclone before being recycled back to the homogenizing valve.

The removal of impurities, as aforesaid, by cycloning after conditioning by passage through the homogenizing valve can be enhanced by the use of special additives, preferably added to the clay slurry prior to passage through the homogenizing valve. These additives affect the impurities in some way by passage through the homogenizer, to cause more of them to report to the underflow of the hydroclassifier with the oversize. This combination of conditioning by passage through the homogenizing valve in the presence of the special additives can produce in some cases unique effects where the special additive will selectively and preferentially cause the removal in the cyclone oversize stream of certain impurities, which would not otherwise report in this manner to the oversize stream.

Examples of such additives are the high molecular weight organic carboxylic acids, such as those found in tall oil, including saturated and unsaturated fatty acids, as for example aliphatic fatty acids, abietic acid, other rosin acids, etc. and salts thereof, particularly the alkali metal and ammonium salts. Examples are ammonium oleate, ammonium abietate and combinations thereof. Tall oil, itself, and salts thereof, particularly ammoniated tall oil, are excellent protective agents. Tall oil fractions which are high in fatty acid content, have been successfully used. They have been found to be particularly effective additives when first reacted with ammonia. Also, a tall oil pitch sold under the name Tallene by West Virginia Pulp & Paper Company has been used successfully. This pitch, when reacted or emulsified with ammonia in water, is an exceedingly effective additive. It is believed that the presence of certain unsaponifiable components in the Tallene also has a beneficial effect in promoting selectivity. Alkali metal and ammonium sulfates, such as sodium sulfate, can also be used as an additive.

Thus, the invention is seen to comprise firstly the combination of a homogenizing valve with a hydroclassifier with recycle of the oversize stream to achieve grinding of substantial amounts of small kaolin particles, e.g., minus 25 microns; secondly, a combination of homogenizing valve and a hydroclassifier in order to remove impurities from an impure clay slip and thirdly, the combination of a homogenizing valve, a hydroclassifier and special additives which in some cases will given enhanced beneficiation of clay slips.

In practicing all aspects of the invention, it is frequently desirable to add a dispersant to the kaolin ore or concentrate when forming a slurry. Such dispersing agents lower the viscosity of the resulting slip and improve the efficiency of the pump and homogenizing valve assembly as well as the classifier in accomplishing the objects of this invention. Known dispersants for clay may be used, such as the polyphosphates, as for example, alkali metal (sodium) hexametaphosphate, sodium silicate, soda ash, sodium hydroxide, etc.

The invention will be more clearly understood by reference to the accompanying illustrative drawings in which.

Figure 1:
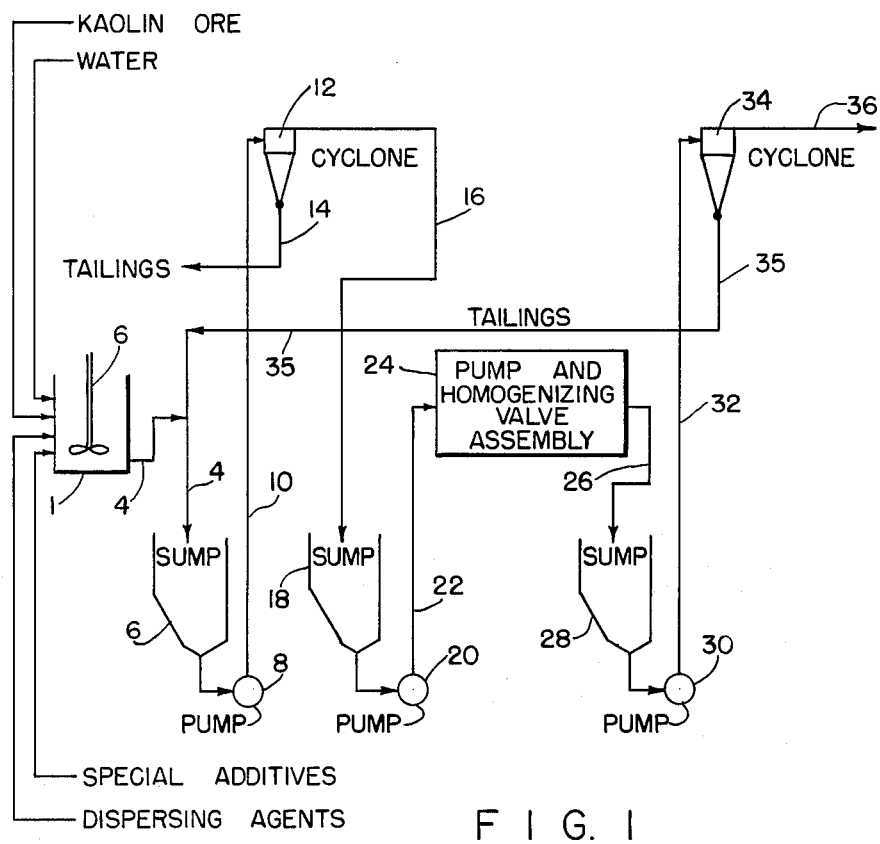
FIGURE 1 is a flowsheet of a method embodying the present invention.

With reference to FIGURE 1, the slurry of kaolin ore or concentrate is prepared (e.g., 35% solids by weight) in tank 1 by introducing the water and ore and agitating with agitator 2. Thereafter and with continued agitation the dispersing agent such as sodium hexametaphosphate and, when practicing the third aspect of this invention, one or more special additives are added to the slurry in tank 1. The slurry is then passed through line 4 to sump 6 from whence it is pumped by pump 8 through line 10 to hydrocyclone 12. The underflow or tailings 14 of hydrocyclone 12 containing the oversize may be discarded. The overflow 16 of cyclone 12 flows to sump 18 from whence it is pumped by pump 20 through line 22 to the pump and homogenizing valve assembly 24 or group of assemblies in series having the construction shown and described in U.S. Patent No. 3,039,703 (with rotating valve and impact ring and stationary valve seat and without a rotating blade) or that shown and described in U.S. patent application Serial No. 316,187, now Patent No. 3,162,379. The output from the pump and homogenizing valve assembly or assemblies 24 is passed through line 26 to sump 28 and thence through pump 30 through line 32 to hydrocyclone 34 or a plurality of hydrocyclones either in series or parallel. The oversize particles and a substantial amount of impurities, if present, report to the underflow 35 of hydrocyclone 34 and are recycled back to sump 6 of hydrocyclone 12 and thence through hydrocyclone 12 where the impurities report to the underflow and are discarded. Most of the oversize clay particles in the underflow 35 of hydrocyclone 34 pass to the overflow of hydrocyclone 12 and thence back through the pump and homogenizing valve assembly 24. The overflow 36 from hydrocyclone 34 contains the desired clay particles and is passed to dewatering equipment or additional beneficiating steps, or other treatments as may be necessary. U.S. application Serial No. 363,894 describes a method in which this overflow 36 is subjected to a flocculating step followed by a flotation step.

Where impurities are not removed by the hydrocyclone 34, the underflow 35 may be passed directly to sump 18.

Figure 2:
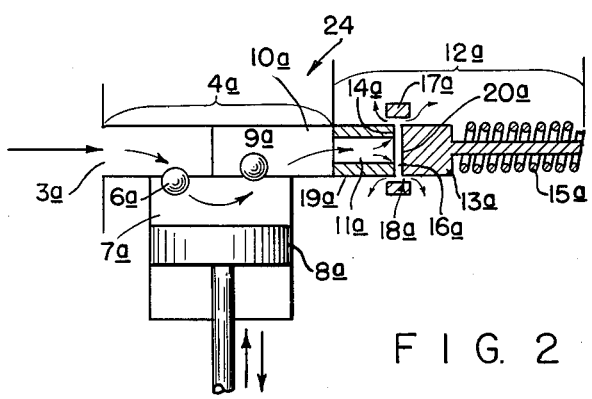
FIGURE 2 is a diagrammatic view showing in cross-section an embodiment of the homogenizing pump and valve assembly of FIGURE 1 for conditioning and grinding the clay prior to passage through the hydroclassifier.

The pump and homogenizing valve assembly 24 is shown diagrammatically in FIGURE 2.

The clay slurry from sump 18 is fed by pump 20 to the inlet 3a of the liquid piston pump 4a of the pressure pump and valve assembly 24. The slurry is sucked from the inlet 3a through the suction ball check valve 6a of pump 4a into the pump cylinder 7a by the suction stroke of piston 8a and is forced through discharge ball check valve 9a to and through the high pressure pump inlet 10a into the high pressure inlet passage or chamber 11a of the valve seat 19a of valve assembly 12a and against valve 13a which is urged towards valve seat 14a by a heavy spring 15a. The high pressure exerted on valve 13a by the slurry in confined passage 11a forces the valve 13a slightly away (a fraction of an inch) from its seat 14a whereby the slurry under pressure flows in the form of a thin film edgewise at an extremely high velocity through the highly restricted valve opening or gap 16a against an annular impact ring 17a extending around the valve. The impact ring may be omitted with certain clay deposits and concentrates but it is highly preferred. With the impact ring 17a, the slurry then will flow through the narrow passages 18a between the ring 17a and the adjacent outer peripheral walls of the valve 13a and valve seat 19a.

A peculiar kind of conditioning and grinding of the kaolin particles is achieved in the homogenizing valve assembly 24 to make the clay more amenable to the removal of impurities in the subsequent hydroclassifier 34. It is believed that this is caused by the combined turbulence, shearing, cavitational and impact forces in the homogenizing valve assembly. The various changes in directional flow of slurry from 11a to 16a (the direction of flow through the gap 16a is at an angle to the direction of flow in 11a to the gap) and from 16a to 18a also contribute to this grinding and conditioning of the kaolin particles.

If desired, the valve 13a can be mechanically held in the position shown in FIG. 2 spaced from the valve seat to provide the proper gap width. In such case, the gap remains open the proper amount even when the slurry is not being pumped against the valve. This can be achieved, for example, by threading the right end (as viewed in FIG. 2) of the valve stem and passing it through a frame member and nut (not shown), the rotation of which nut is effective to draw the valve away from the valve seat by any desired amount against the force of the spring.

The slurry leaving the valve assembly 12a may be discharged into another tank (not shown) whereupon it can be passed directly to sump 28 or it can be passed through another or a plurality of pump and homogenizing valve assemblies (not shown) or passed through the same pump and valve assembly again one or more times before being passed to sump 28. From sump 28 it passes to the hydrocyclone unit 34 for rejection in the underflow or tailings of oversized particles and also certain impurities if present. As aforesaid, the rejection of the impurities is unexpectedly enhanced by the conditioning effect of the homogenizing valve or valves.

As aforesaid, where it is desired to achieve a high grade coating or filling clay for paper, which requires a large amount of minus 2 micron particles, the underflow from the cyclone 34 is passed to sump 6 and thence through cyclone 12 where the impurities are rejected and discarded with the underflow or tailings. The overflow from cyclone 12 contains most of the oversize clay particles from the underflow of cyclone 34, many of which are minus 25 micron particles. It will be apparent that the hydrocyclone 34 is designed in known manner to restrict the clay particles reporting to the overflow to much finer particle sizes, as compared to hydrocyclone 12, i.e., to achieve a relatively large amount of minus 2 micron particles in the overflow and reject most of the larger particles. This, of course, results in the underflow of cyclone 34 containing a greater amount of finer clay particles, e.g. minus 25 microns plus 2 microns, as compared to cyclone 12. Whereas cyclone 34 rejects the minus 25 micron plus 2 micron clay particles, these particles report to the overflow in cyclone 12 and, consequently, they are continued to be subjected to the action of the homogenizing valve until they are reduced to minus 2 microns.

The pressures used in the pump and homogenizing valve assembly 24 (as low as 100, preferably at least 600 and more preferably between 1,000 or 5,000 lbs. p.s.i.) and the gap (16a) widths (fraction of an inch, usually .001 to .005 inch but under certain conditions as large as .09 inch or even 0.1 inch) described in application Serial No. 316,187, now Patent No. 3,162,379, can be used.

As indicated above, hydroclassifiers other than hydrocyclone 34 may follow the pump and homogenizing valve assembly 24, e.g., a solid bowl centrifuge, etc.

In the case of hydrocyclones, 8 inch, 3 inch, 30 mm. and 10 mm. cyclones have been found useful in practicing the present invention. These cyclones are of conventional design and are well-known to those skilled in the art. For example, 10 mm. hydrocyclones 34 and three inch hydrocyclones 12 have been found to give excellent results.

In practicing the third aspect of this invention, that is, the use of special additives in order to selectively coat or react with impurities in the kaolin slip as it is passed through the pump and homogenizing valve assembly 24, it is not possible to assign a definite reason for the success of this method. It has been found, however, that the addition of sodium sulfate, tall oil-ammonia reaction products, saturated and unsaturated fatty acids, etc. either alone or in combination can cause the elimination of discoloring and abrasive impurities in the clay slip by causing them to report in an increased quantity to the tailings 35 of the hydrocyclone 34. The improvement obtained by the use of these additives can be observed by the improved brightness and/or lower abrasiveness of the clay in the stream 36 carrying the finer particles. It is believed that the special additives coat and perhaps cause selective agglomeration of the discoloring and abrasive impurities to prevent them from reporting with the finer clay particles to the overflow even though the impurities are of exceedingly fine particle size themselves.

EXAMPLE 1

A kaolin ore derived from a residual deposit located at Monkton, Vermont, was used. This ore was slurried at 40% solids in tank 1 with water and 2 lbs. per ton, based on the dry ore fraction, of sodium hexametaphosphate. No special additives were used. The slurry was passed through cyclone 12 to sump 18. The solids in the overflow from cyclone 12 was 100% finer than 12 microns and 50% finer than 2 microns. It had a loss on ignition (LOI) of 6.8% when heated for 3 hours at 1400° F. This LOI indicated an approximate kaolinite content of 48.6%. The higher the LOI for this ore, the greater the kaolinite content and hence the less impurities present.

For Run A, the slurry (still about 40% solids) was passed from sump 18 via pump 20 directly to sump 28 by-passing the pump and homogenizing valve assembly 24. The slurry was passed via pump 30 to a bundle of four 10 mm. hydrocyclones 34 in parallel.

A beneficiated kaolin slurry was obtained from the overflow of the hydrocyclones 34. The LOI, as an indication of purity, of the solids was measured and is presented in the table below. The solids recovery from such slurry was determined and is presented in the table below.

Another run, Run B, was performed as in Run A above except that the slurry from sump 18, which was still about 40% solids, was passed via pump 20 to the pump and homogenizer assembly 24 which operated at a pressure of 1500 p.s.i. at a rate of 2 g.p.m. The discharge of the valve assembly 12a was passed directly to sump 28. The slurry was then passed to the bundle of 10 mm. hydrocyclones 34 exactly as in Run A above. The results obtained for this run are given in the table below.

Another run, Run C, was performed on the same ore as used in A. As before, a 40% slurry was prepared in tank 1 together with 2 lbs. per ton, based on the dry ore fraction, of sodium hexametaphosphate. However, for this run, 5 lbs. per ton of oleic acid and 5 lbs. per ton of 41° Baumé Acme grade sodium silicate, manufactured by the General Chemical Division of Allied Chemical Corporation, was also added to tank 1. After agitation in tank 1, the reagentized slurry was treated exactly as in Run B. The results of this run are also presented in the table below.

Table

| Run | A | B | C |
|---|---|---|---|
| LOI of feed to hydrocyclones 34 in percent | 6.8 | 6.8 | 6.8 |
| LOI of solids in overflow from hydrocyclones 34 in percent | 8.8 | 9.8 | 10.3 |
| Recovery of solids in overflow from cyclones 34 in percent | 18.2 | 29.3 | 29.8 |
| Abrasion test of solids in overflow from cyclones, mg. wire loss | 175 | 80 | 30 |

A comparison of the results obtained in Runs A and B indicates that the use of the pump and homogenizing valve assembly 24 achieves a higher loss on ignition (higher LOI) in the hydrocyclone 34 overflow and at an improved recovery. A comparison of Runs B and C indicates that even higher purities can be obtained (as indicated by the higher LOI) without a sacrifice in recovery by the use of the oleic acid and silicate additives.

These results were further confirmed by performing a standard Valley Abrasion test on the overflow products obtained from Runs A, B and C. This abrasion test is well-known to those skilled in the art and consists of measuring the amount of weight loss from a simulated paper machine wire mesh as it is scrubbed in a slurry of the clay to be tested. The product obtained from the hydrocyclone 34 overflow without using the pump and homogenizer valve assembly 24 had the highest wire loss, 175 mg. and was therefore the most abrasive. The product obtained in Run B using the pump and homogenizing valve assembly 24 was approximately half as abrasive. The product obtained in Run C using the pump and homogenizing valve assembly 24, together with special additives gave the best result with respect to abrasion.

Thus, it is shown that practicing the present invention results in improved clay beneficiation with products of improved utility in paper.

It has been found that the addition of an alkali metal silicate, e.g., sodium silicate, with the saturated and unsaturated fatty acid additives enhances the effect of such fatty acids in the removal of impurities in the hydrocyclones 34.

It has also been found that in some cases with the use of the additives as in Run C, holding all things equal, the relative volumes of slurry which report to the overflow and underflow of the cyclone is changed. Where a greater volume reports to the overflow a greater recovery of the desired fine clay particles is achieved. While this cannot be explained at this time, it may have some bearing on why these additives work the way they do in increasing the amount of impurities rejected with the underflow.

EXAMPLE 2

In Run 1, a measured amount of a Minnesota kaolin, which had about 30% minus 2 micron particles, in the the form of a 40% slurry, was passed through the flow sheet of FIG. 1 with the slurry from tank 1 being passed directly to sump 18 (by-passing cyclone 12), with the tailings 35 being recycled directly to sump 18 and thence through the homogenizing pump and valve assembly 24 (by-passing cyclone 12) four times and without adding to the recycle any new feed. The total amount of minus 2 micron particles in the overflow 36 for the entire feed sample was measured.

In Run 2, the same amount of the same ore, using the same solids concentration, was subjected to the same processing except that the underflow 35 from cyclones 34 was not recycled but instead the total slurry from pump and homogenizing valve assembly 24 was recycled four times through such assembly before being passed to cyclones 34. The amount of minus 2 micron particles in the overflow 36 for the entire feed sample was measured.

It was found that the amount of minus 2 micron clay particles in the overflow 36 in Run 1 was more than 300 in percent greater than in Run 2.

We claim:

1. A method of purifying clay comprising the step of forcing a liquid slurry of particles of said clay in the form of a thin film edgewise through a thin, hard-surfaced gap under a high pressure and at an extremely high velocity by virtue of reduction of said high pressure to a substantially lower pressure, and the step of subjecting the slurry discharged from said gap to a hydroclassifying step, whereby the amount of impurities separated from said clay by said hydroclassifying step is increased by said step of forcing said slurry through said gap.

2. A method of treating clay comprising the step of forcing a liquid slurry of particles of said clay in the form of a thin film edgewise through a thin, hard-surfaced gap under a high pressure and at an extremely high velocity by virtue of reduction of said high pressure to a substantially lower pressure and the step of subjecting the slurry discharged from said gap to a subsequent hydroclassifying step.

3. A method according to claim 2 including recycling the stream of rejected oversize particles of said clay from said subsequent hydroclassifying step, back through said gap.

4. A method according to claim 3, including subjecting said slurry to a preceding hydroclassifying step prior to passage through said gap and passing the overflow stream from said preceding hydroclassifying step through said gap, said stream of oversize particles rejected by said subsequent hydroclassifying step being recycled back through said preceding hydroclassifying step, the particle sizes in said stream of rejected oversize particles being substantially smaller than the particle sizes in the rejected oversize stream in said preceding hydroclassifying step, whereby at least a major portion of the particles in said rejected oversize stream of said subsequent hydroclassifying step report to the overflow of said preceding hydroclassifying step and are recycled through said gap.

5. A method according to claim 2, said hydroclassifying step comprising the step of passing said slurry discharged from said gap through a hydrocyclone.

6. A method according to claim 2, said slurry forced through said gap containing an additive of the group consisting of a saturated fatty acid, alkali metal and ammonium salts thereof, an unsaturated fatty acid, alkali metal and ammonium salts thereof, a cyclic tall oil acid, alkali metal and ammonium salts thereof and an alkali metal sulfate.

7. A method according to claim 6, said slurry also containing an alkali metal silicate.

8. A method according to claim 6, said slurry also containing a dispersing agent.

9. A method according to claim 2, said slurry forced through said gap containing a dispersing agent.

No references cited.

LESTER M. SWINGLE, *Primary Examiner.*

DONALD G. KELLY, *Assistant Examiner.*